United States Patent
Zhang (10) Patent No.: US 10,992,394 B2
(45) Date of Patent: Apr. 27, 2021

(54) METHOD FOR CHANNEL PARAMETERS CONSISTENCY CALIBRATION IN MULTI-CHANNEL PHASED ARRAY SYSTEMS

(71) Applicant: Chengdu Sicore Semiconductor Corp. Ltd., Chengdu (CN)

(72) Inventor: Cemin Zhang, Chino, CA (US)

(73) Assignee: Chengdu Sicore Semiconductor Corp. Ltd., Chengdu (CN)

( * ) Notice: Subject to any disclaimer, the term of this patent is extended or adjusted under 35 U.S.C. 154(b) by 0 days.

(21) Appl. No.: 16/746,862

(22) Filed: Jan. 18, 2020

(65) Prior Publication Data
US 2020/0382226 A1  Dec. 3, 2020

(30) Foreign Application Priority Data
Nov. 20, 2018 (CN) .......................... 201811384202.5

(51) Int. Cl.
H04B 17/12  (2015.01)
H04B 17/21  (2015.01)

(52) U.S. Cl.
CPC ............. *H04B 17/12* (2015.01); *H04B 17/21* (2015.01)

(58) Field of Classification Search
CPC ........ H04B 17/12; H04B 17/21; H04B 17/24; H04B 17/318; H04W 4/02; H04W 24/02; H04W 84/12; H04W 88/08
See application file for complete search history.

(56) References Cited

U.S. PATENT DOCUMENTS

| | | | | |
|---|---|---|---|---|
| 6,429,812 | B1* | 8/2002 | Hoffberg | H04B 7/18576 342/357.31 |
| 2010/0207819 | A1* | 8/2010 | Uhl | H01Q 3/2605 342/372 |
| 2012/0139776 | A1* | 6/2012 | Malmqvist | H01Q 3/267 342/174 |
| 2012/0188116 | A1* | 7/2012 | Mosca | H01Q 3/267 342/174 |
| 2016/0211898 | A1* | 7/2016 | Cai | H04B 7/0617 |
| 2018/0115064 | A1* | 4/2018 | Safavi-Naeini | H01Q 3/267 |
| 2020/0169896 | A1* | 5/2020 | Li | H04B 17/24 |

\* cited by examiner

*Primary Examiner* — Thanh C Le
(74) *Attorney, Agent, or Firm* — North Weber and Baugh LLP; Michael North (57) ABSTRACT

Embodiments of channel parameters consistency calibration methods in multi-channel phased array systems are disclosed. The method comprises a reference channel calibration step and a calibration step for other channels to be calibrated. The reference channel calibration step comprises selecting one channel as a reference channel and performing a full state calibration on the reference channel to generate full state control data set S(A). Parameters to be calibrated in the calibration step of the uncalibrated channel may be a phase shift amount or an attenuation amount. The calibration step for the uncalibrated channel comprises a calibration under at least one specified parameter group. Compared with the conventional calibration methods, the present calibration method greatly shortens the calibration time, reduces the required data storage capacity, thereby improves efficiency for completing the consistence calibration of the parameters for multi-channel phased array systems.

20 Claims, 2 Drawing Sheets

METHOD FOR CHANNEL PARAMETERS CONSISTENCY CALIBRATION IN MULTI-CHANNEL PHASED ARRAY SYSTEMS

CROSS-REFERENCE TO RELATED APPLICATIONS

This application claims foreign priority under 35 U.S.C. § 119(a) to Chinese Patent Application No. 201811384202.5, entitled "METHOD FOR CHANNEL PARAMETERS CONSISTENCY CALIBRATION IN MULTI-CHANNEL PHASED ARRAY SYSTEMS", naming Cemin Zhang as inventor, and filed Nov. 20, 2018, the subject matter of which is hereby incorporated herein by reference.

FIELD OF THE INVENTION

The present invention relates to the field of radio frequency communications, particularly to a method for a channel parameters consistency calibration in multi-channel phased array systems, and more specifically to a calibration method of a phase shift error and a calibration method of an attenuation error.

BACKGROUND OF THE INVENTION

In applications of microwave and radio frequency communications, a phased array system generally comprises multiple channels. For example in a 5G communication system, the phased array system needs to integrate anywhere from dozens of channels to as many as tens of thousands of channels. Key channel parameters such as phase and amplitude are required to remain to be consistent for all channels of the phased array system, and a phase shift error between any two channels is required to be as small as possible. To that end, parameter values of the multi-channel phased array system need to be calibrated.

Each channel in the phased array system may be a transmitting unit or a receiving unit, or may be a phased array transceiver unit integrating both transmitter and receiver, wherein the phased array transceiver unit includes a transmitting channel and a receiving channel. Both the transmitting channel and the receiving channel are provided with a phase shifter and/or an variable attenuator, wherein the phase shifter may be either a digital phase shifter or an analog phase shifter for controlling the phase shift amount of the transmitting channel or the receiving channel, and the variable attenuator may be either a digital attenuator or an analog attenuator for controlling the attenuation amount of the transmitting channel or the receiving channel.

In actual operation, when the phase shift amount of a phase shifter in a single phased array transceiver unit varies, the insertion loss of the phase shifter may vary accordingly; under a same control condition, due to unit process variations, the phase shift amount of each phase shifter in the transmitting channels or the receiving channels is different from each other; variations in attenuation amount of a variable attenuator may cause variations in phase shift amount thereof; when the phase shifters and the variable attenuators in each of the channels receive a same control word from a system control unit, the generated phase shift amounts and attenuation amounts may be different channel to channel.

The aforementioned factors make the multi-channel phased array system unable to simply apply calibration data information from a single reference channel to other channels. Meanwhile, a full calibration process for the single reference channel requires long time to complete. Thus in a case of a phased array system with a large number of channels, such as tens of thousands, the full calibration process for every channel in the system takes a significant amount of time. Besides, even if every channel is fully calibrated without considering time cost, the total amount of data generated during channel calibration may exceed the capacity of system memory, and the data reading speed may also be greatly reduced.

BRIEF SUMMARY OF THE INVENTION

Figure 1:
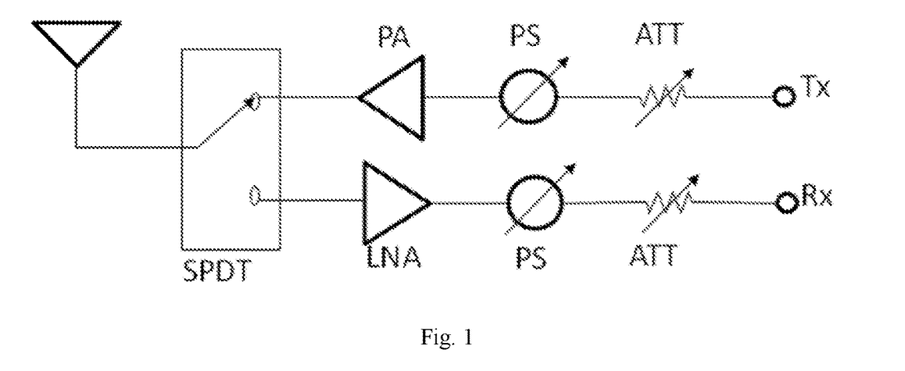
FIG. 1 shows the architecture of the phased array transceiver unit in the conventional phased array system.

A conventional phased array system includes multiple channels. With the continuous development of the phased array system, the number of channels in the phased array system is increasing. Even a 128×128 array scheme has been proposed in a 5G measurement system, allowing a single phased array system to have tens of thousands of channels. Each channel in the phased array system may be a transmitting channel or a receiving channel, or may be a transceiver channel integrating a transmitter and a receiver, i.e. the phased array transceiver unit. As shown in FIG. 1, each of the phased array transceiver units comprises a transmitting channel (Tx) and a receiving channel (Rx), with the transmitting mode and the receiving mode switched by a single-pole double-throw switch (SPDT). Each of the transmitting channel and the receiving channel is provided with a phase shifter (PS) for controlling the phase shift amount of the channel and a variable attenuator (ATT) for controlling the attenuation amount of the channel.

In actual operation, the conventional phased array system has following drawbacks:

(1) when the phase shift amount of a phase shifter in a single channel varies, its associated insertion loss may vary accordingly;

(2) the variation in the attenuation amount of a variable attenuator may cause variation in the phase shift amount thereof; and (3) when the phase shifters and the variable attenuators in each of the channels receive a same control word from a system control unit, the generated phase shift amount and attenuation amount may be different channel to channel.

Figure 2:
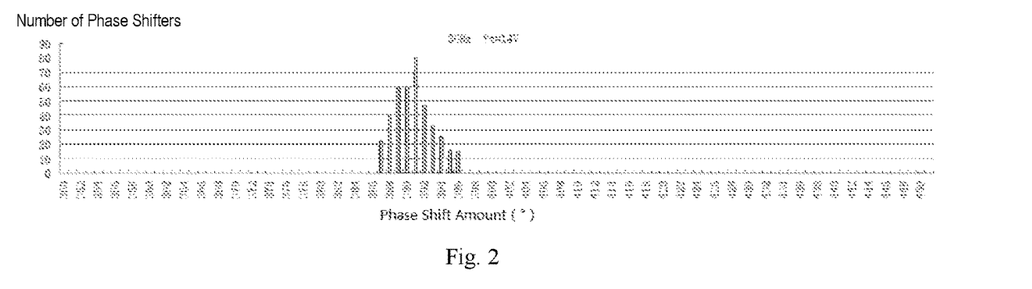
FIG. 2 shows a measured phase shift amount distribution of conventional analog phase shifters from a same batch lot under a test condition of a control voltage Vt at 14V and a frequency at 3 GHz.

FIG. 2 shows a measured phase shift amount distribution of analog phase shifters from a same batch lot under a test condition of a control voltage (Vt) at 14V and a frequency at 3 GHz. As shown in FIG. 2, under the same voltage and frequency conditions, the phase shift amounts of the analog phase shifters are approximately distributed in a range of 391°±5°.

However, the phase shift precision of some high-precision phased array system is required to be <1°. As a result, when the phase shift amount or the attenuation amount in each channel is calibrated, the phased array system cannot simply apply the calibration data information from a single reference channel directly to the rest of channels. In prior art, a full calibration for each channel is required. However, the full calibration for a single channel would take a long time and generate a huge amount of data. As the number of the channel in the phased array system constantly increases, the time for a multi-channel parameters consistency calibration for the phased array system, as well as the occupied data storage space for the system memory may increase remarkably. Therefore, the conventional calibration method for multi-channel phased array system cannot meet the increasing requirements of system precision and the number of channels.

To solve the aforementioned problems, the present invention provides a method for a channel parameters consistency calibration in multi-channel phased array systems. Such method has faster calibration speed and requires smaller data storage capacity.

The present invention is realized by following technical solutions:

A method for a channel parameters consistency calibration in multi-channel phased array systems, comprising:

a reference channel calibration step and a calibration step of other channels to be calibrated, wherein the reference channel calibration step comprises following steps: selecting any one channel from all channels as a reference channel A, performing a full state calibration on the reference channel A to generate full state control data set S(A), the full state control data set S(A) including a plurality of state control data $S_{ijk}(A)$, and storing the plurality of the state control data $S_{ijk}(A)$, wherein i refers to an i-th specified parameter group, j refers to a j-th phase shift state, and k refers to a k-th attenuation state.

The reference channel calibration is the conventional calibration for a single channel According to the system requirements, the reference channel calibration process is able to control the attenuators and the analog phase shifters via digital-to-analog converters (DAC) to perform a full state calibration on the phase shift amount, phase shift step and attenuation amount of the reference channel under different control states. The reference channel calibration process is a cyclic convergence process continuously adjusting the phase and attenuation amplitude for each state of the system, e.g. using a regression algorithm. The calibration ends when the precision of the phase shift step and the error of the attenuation amount are less than a predetermined value. After the reference channel calibration is completed, the obtained full state control data set S(A) is stored in system memory to calibrate other channels to be calibrated.

The present invention improves the calibration method of channels (other than the reference channel) to be calibrated.

Particularly, the calibration step of channels (other than the reference channel) to be calibrated comprises a calibration under at least one specified parameter group.

The at least one specified parameter group refers to a group of specified parameters selected in the calibration process, the group of the specified parameters comprising at least one specified parameter, wherein the at least one specified parameter comprises one or more of operating conditions such as temperature, frequency and input power. The person skilled in the art should appreciate that the specified parameter may also comprise other parameters in the field of phased array system calibration.

When the calibration is performed, in the calibration step of channels (other than the reference channel) to be calibrated, the values of the specified parameters of the specified parameter groups should be constant in each calibration. If a value of one specified parameter varies, or a calibration is to be performed under various state values of a certain specified parameter, more than one specified parameter groups can be set, and the total number of the specified parameter groups should be equal to the product of the number relating to how many different parameter values are specified in the specified parameter. For instance, in a case that the specified parameters are temperature, frequency and input power, the values of the temperature and input power are constant, and the state control data needs to be calibrated at two different frequencies, two specified parameter groups which are different in frequency value should be set. In a case that the value of the input power is constant, and the state control data needs to be calibrated at two different frequencies and two different temperatures, four specified parameter groups should be set, wherein two frequency values and two temperature values form totally four combinations of parameter groups.

After each specified parameter in each of the specified parameter groups is determined, a selection of the parameter to be calibrated is performed prior to the calibration step of channels (other than the reference channel) to be calibrated, wherein the parameter to be calibrated is either a phase shifting amount or an attenuation amount. While one of the phase shifting amount and the attenuation amount is selected as the parameter to be calibrated, the other one is selected as a constant parameter. For example, if the phase shifting amount is the parameter to be calibrated, the attenuation amount is the constant parameter.

In the present invention, the calibration step of channels (other than the reference channel) to be calibrated under a same specified parameter group includes two modes. One is to calibrate the phase shift amount in a specified attenuation state, and the other one is to calibrate the attenuation amount in a specified phase shift state. Therefore, the calibration step of channels (other than the reference channel) to be calibrated comprise a phase shift amount calibration under at least one specified parameter group as well as in the specified attenuation state, or an attenuation amount calibration under at least one specified parameter group as well as in a specified phase shift state.

The parameter calibration steps for the phase shift amount or the attenuation amount as the parameter to be calibrated are described respectively in details below.

In particular, under a specified parameter group, a phase shift amount calibration with a constant attenuation state includes following steps.

S01: for a full state control data set S(A), a specified parameter group and an attenuation state corresponding to an operating attenuation state are selected, i.e. an i-th specified parameter group and a k-th operating attenuation state in the state control data $S_{ijk}(A)$ are selected. After the specified parameter group and its corresponding specified parameter values are selected, the constant parameter is the attenuation amount, and the parameter to be calibrated is the phase shift amount in different phase shift states.

S02: selecting one uncalibrated channel X from channels other than the reference channel A as the channel to be calibrated, selecting n groups of phase shift state control data from S(A) for the uncalibrated channel X, n≥1, wherein specified parameter values corresponding to the n groups of the phase shift state control data are equal to the specified parameter values selected in step S01, and an attenuation amount corresponding to the n groups of the phase shift state control data is equal to the attenuation amount selected in step S01;

during calibration operation of the uncalibrated channel X, the specified parameter values of the uncalibrated channel X are equal to the specified parameter values in the specified parameter group determined in step S01, and the attenuation amount of the uncalibrated channel X is equal to the attenuation amount selected in step S01; and respectively controlling phase shift amounts of the uncalibrated channel X with the selected n groups of the phase shift state control data, and reading a plurality of corresponding phase shift amounts $P_{X1}, P_{X2} \ldots P_{Xn}$ of the uncalibrated channel X.

S03: reading a plurality of phase shift amounts $P_{A1}, P_{A2} \ldots P_{An}$ of the reference channel A under control of the same n groups of the phase shift state control data, with specified parameter values of the reference channel equal to the specified parameter values in the specified parameter group determined in step S01, and the attenuation amount of the reference channel equal to the selected attenuation amount in step S01; and no precedence order between step S02 and step S03.

S04: calculating a phase shift deviation $D_{AqXq}$ between $P_{Aq}$ and $P_{Xq}$ according to a formula of $D_{AqXq}=P_{Xq}-P_{Aq}$, to obtain n phase shift deviations $D_{A1X1}, D_{A2X2} \ldots D_{AnXn}$.

S05: performing a fitting on at least two values selected from a group of initial data point, $D_{A1X1}, D_{A2X2} \ldots D_{AnXn}$ to obtain a phase calibration function F(D).

S06: calculating full state control data $S_{ijk}(X)$ of the uncalibrated channel X with a formula of $S_{ijk}(X)=S_{ijk}(A)+F_{ijk}$, wherein $S_{ijk}(A)$ refers to state control data of the reference channel A working at an i-th specified parameter group, a j-th phase shift amount state and a k-th attenuation amount state; $S_{ijk}(X)$ refers to the state control data of the uncalibrated channel X working at the i-th specified parameter group, the j-th phase shift amount state and the k-th attenuation amount state; $F_{ijk}$ is phase calibration data generated by the phase calibration function F(D) as the uncalibrated channel X working at the i-th specified parameter group, the j-th phase shift amount state and the k-th attenuation amount state; thus the corresponding phase shift control data of the uncalibrated channel X is calibrated according to the required specified parameter group and the operating attenuation state of the uncalibrated channel X to obtain the full state phase shift control data from $S_{ijk}(X)$.

S07: repeating steps S02-S06 until all the channels obtaining full state phase shift control data, and then ending the calibration.

Under each specified parameter group, an attenuation amount calibration with a constant phase shift state includes following steps.

S01: for a full state control data set S(A), a specified parameter group and a phase shift state corresponding to an operating phase shift state are selected, i.e. an i-th specified parameter group and a j-th operating phase shift state in the state control data $S_{ijk}(A)$ are selected. After the specified parameter group and its corresponding specified parameter values are selected, the constant parameter is the phase shift amount, and the parameter to be calibrated is the attenuation amount in different attenuation states.

S02: selecting one uncalibrated channel X from channels other than the reference channel A as a channel to be calibrated, selecting n groups of attenuation amount state control data from S(A) for the uncalibrated channel X, n≥1, wherein specified parameter values corresponding to the n groups of the attenuation amount state control data are equal to the specified parameter values selected in step S01, and a phase shift amount corresponding to the n groups of the attenuation amount state control data is equal to the phase shift amount selected in step S01;

during calibration operation of the uncalibrated channel X, the specified parameter values of the uncalibrated channel X are equal to the specified parameter values in the specified parameter group determined in step S01, and the phase shift amount of the uncalibrated channel X is equal to the phase shift amount selected in step S01; and respectively controlling attenuation amounts of the uncalibrated channel X with the selected n groups of the attenuation amount state control data, and reading a plurality of corresponding attenuation amounts $P_{X1}, P_{X2} \ldots P_{Xn}$ of the uncalibrated channel X.

S03: reading a plurality of attenuation amounts $P_{A1}, P_{A2} \ldots P_{An}$ of the reference channel A under control of the same n groups of the attenuation amount state control data, with specified parameter values of the reference channel equal to the specified parameter values in the specified parameter group determined in step S01, and the phase shift amount of the reference channel equal to the selected phase shift amount; and no precedence order between step S02 and step S03.

S04: calculating an attenuation deviation $D_{AqXq}$ between $P_{Aq}$ and $P_{Xq}$ according to a formula of $D_{AqXq}=P_{Xq}-P_{Aq}$, to obtain n attenuation deviations $D_{A1X1}, D_{A2X2} \ldots D_{AnXn}$.

S05: performing a fitting on at least two values selected from a group of initial data point, $D_{A1X1}, D_{A2X2} \ldots D_{AnXn}$ to obtain an attenuation amount calibration function F(D).

S06: calculating full state control data $S_{ijk}(X)$ of the uncalibrated channel X with a formula of $S_{ijk}(X)=S_{ijk}(A)+F_{ijk}$, wherein $S_{ijk}(A)$ refers to state control data of the reference channel A working at an i-th specified parameter group, a j-th phase shift amount state and a k-th attenuation amount state; $S_{ijk}(X)$ refers to the state control data of the uncalibrated channel X working at the i-th specified parameter group, the j-th phase shift amount state and the k-th attenuation amount state; $F_{ijk}$ is attenuation amount calibration data generated by the attenuation amount calibration function F(D) as the uncalibrated channel X working at the i-th specified parameter group, the j-th phase shift amount state and the k-th attenuation amount state; thus the corresponding attenuation amount control data of the uncalibrated channel X is calibrated according to the required specified parameter group and the operating phase shift state of the uncalibrated channel X to obtain the full state attenuation amount control data $S_{ijk}(X)$.

S07: repeating steps S02-S06 until all the channels obtaining full state attenuation amount control data, and then ending the calibration.

The person skilled in the art should appreciate that without considering the effect of the temperature and input power on the phase shift amount or the attenuation amount, the calibration of the phase shift amount or the attenuation amount can be performed at a single frequency by setting one specified parameter group, and can also be performed at multiple frequencies by setting a plurality of specified parameter groups, which mainly relies on whether the phase shifter used by the channel is an analog phase shifter or a digital phase shifter, and whether the attenuator is an analog attenuator or a digital attenuator.

For a single chip of the analog phase shifter used in the present invention, the core components of the phase shifter such as the varactors are all integrated on one single chip. The size deviations of the varactors caused by the manufacturing process are larger or smaller at the same time, so that their phase shift deviations at different operation frequencies are larger or smaller simultaneously. Thus phase shift deviations among different analog phase shifters are almost independent of the frequency variation. As a result, if the phase shifters used in the channels to be calibrated of the phased array system are analog phase shifters, the calibration can be performed at only one operating frequency, e.g. 4.5 GHz. However, for the digital phase shifters, the phase shift deviations among different digital phase shifters may be affected by some level of the frequency variation, so that the channels to be calibrated can be calibrated at multiple operating frequencies. Similarly, if the analog attenuator is used, the calibration can be performed at only one operating frequency, and if the digital attenuator is used, the calibrations need to be performed at multiple operating frequencies.

When the parameter value to be controlled is the phase shift amount of the analog phase shifter, the micro control unit of the phased array system transmits control word to the digital-to-analog converter, which the latter generates control voltage according to the control word and transmits the control voltage to the analog converter to generate the phase shift amount. When the parameter value to be controlled is the attenuation amount, the micro control unit of the phased array system controls the variable attenuator.

The individual differences of the phase shifters or the attenuators cause the deviations between $P_{Xn}$ and $P_{An}$, that is $P_{Xn}=P_{An}+D_{AnXn}$. The n groups of the state control data can generate n phase shift deviations or n attenuation deviations, which add the initial data point value, i.e. the phase shift deviations or the attenuation deviation is zero, to obtain n+1 deviations in total. Thereafter the calibration function F(D) can be obtained by a linear fitting or a nonlinear fitting of the initial data point, $D_{A1X1}$, $D_{A2X2}$ . . . $D_{AnXn}$. The fitting methods used herein are well known in the art, for example, fitting a straight line through two data points, fitting a curve through three data points not on the same straight line, and the like. The present invention is not intended to further define the fitting methods or the formulas. It should be noted that the fitting of multiple deviations can also adopt combinations of some different calibration functions, for example, a linear fitting is used to fit the $D_{A1X1}$ and initial data point, and a nonlinear fitting is used to fit the $D_{A1X1}$, $D_{A2X2}$ and $D_{A3X3}$, aiming to further improve fitting accuracy and reduce calibration errors.

Apart from the aforementioned calibrations at the single frequency or at the multiple frequencies, a plurality of specified parameter groups can be also set to realize calibrations of the phase shift amount or the attenuation amount at different temperatures and input powers. For instance, by disposing a temperature monitoring module in the phased array system, the effect of different temperature conditions on the phase shift deviation or the attenuation deviation can be calibrated, and the calibration results are also reflected in the calibration function F(D) and the calibration data F. Similarly, the effects of different input powers on the phase shift deviation or the attenuation deviation can be calibrated, and the calibration results are also reflected in the calibration function F(D) and the calibration data F.

In the calibration process under a plurality of specified parameter groups, after the full state control data of all the channels under one specified parameter group is calibrated, the channels can be fully calibrated under the rest of the specified parameter groups in the same manner, wherein the rest of the specified parameter groups is selected according to the particular types of the phase shifter and the variable attenuator, as well as the temperature, input power and other specified parameters known in the art that can affect the calibration of the phase shift amount or the attenuation amount.

The aforementioned calibration method performs a full state calibration on any reference channel to generate the full state control data set S(A), so that the calibration of the uncalibrated channel X under one specified parameter group requires a minimum of two reading operations, wherein one reading operation is to read the full state control data set S(A), and the other reading operation is to read the parameter value of the uncalibrated channel X once. Then the calibration function F(D) is obtained by fitting the initial data point value and one deviation of the parameter value, thereby obtaining the full state control data set S(X) of the uncalibrated channel X. Such calibration process needs not to perform a full state calibration on the phase shift amount and the attenuation amount of the uncalibrated channel X in different control states, not only greatly shortening the calibration time, reducing the required data storage capacity, but also significantly improving the calibration precision, thereby precisely and quickly completing the consistence calibration of the parameters among tens of thousands of channels, which has a wide promotion value.

As a preferred embodiment of the present invention, the step S04 further comprises a step of storing $D_{A1X1}$, $D_{A2X2}$ . . . $D_{AnXn}$ after the $D_{A1X1}$, $D_{A2X2}$ . . . $D_{AnXn}$ is obtained, and the stored $D_{A1X1}$, $D_{A2X2}$ . . . $D_{AnXn}$ can be directly used for the fitting in the step S05 to obtain the calibration function F(D). After obtained for the first time, the deviations $D_{A1X1}$, $D_{A2X2}$ . . . $D_{AnXn}$ of uncalibrated channel can be stored in the memory of the system. Although the storage of the memory is slightly increased, the stored deviations $D_{A1X1}$, $D_{A2X2}$ . . . $D_{AnXn}$ can save two reading operations in the steps S02-S03 for subsequent acquisition of the full state control data set S(X) of the other channels, further shortening the system response time.

As another preferred embodiment of the present invention, the calibration step of the uncalibrated channel only calibrates the specified parameter group. That is, in a case that the temperature and the input power are constant, the attenuation amount or the phase shift amount can be calibrated at only one frequency. For example, for the analog phase shifter that the phase shift amount thereof is almost independent from the frequency variation, only one operating frequency is calibrated, and the state data obtained at the operating frequency can be multiplexed on the other operating frequencies to further improve the calibration speed and reduce the data storage capacity. Preferably, the analog phase shifter used herein is the analog phase shifter disclosed in the patent No. CN108631754A, the phase shift deviation of such analog phase shifter in different phase shift state is not affected by the frequency variation, which can effectively improve the calibration precision.

Furthermore, the full state control data set S(A) is state control data of a phase shifter and/or state control data of an variable attenuator in the channels.

Furthermore, the state control data of the phase shifter is used to control a digital-to-analog converter to generate a control voltage of the analog phase shifter.

Furthermore, in the step S04, n=1, and the calibration function is obtained by performing a fitting on the initial data point and $D_{A1X1}$ according to a formula of F(D)=tD, wherein t is a constant. The initial data point indicates the initialization state (generally the control voltage is 0V) of the phase shifter, and is the data point where the parameter value is 0.

As still another preferred embodiment of the present invention, the calibration step of the uncalibrated channel comprising the calibration under a plurality of specified parameter groups, wherein in a calibration process, after the calibration under each of the plurality of the specified parameter groups are completed, the steps S01-S07 are repeated, wherein an uncalibrated one of the plurality of the specified parameter groups is selected in the step S01 as a specified parameter group for a new calibration, until all of the plurality of the predetermined specified parameter groups are calibrated to obtain full state control data of all the channels under all of the plurality of the specified parameter groups.

Furthermore, the one or more specified parameters in each of the plurality of the specified parameter groups comprise a frequency, and the calibration step of the uncalibrated channel comprises the calibration at one or more operating frequencies. Preferably, a lower operating frequency is 3 GHz, a center operating frequency is 4.5 GHz, and an upper operating frequency is 6 GHz. The technical solution of performing the calibration at multiple frequencies is mainly for the digital phase shifter and the digital attenuator.

Compared with the prior art, the present invention has following advantages and beneficial effects.

1. The calibration of the uncalibrated channel X under one specified parameter group requires a minimum of two reading operations, wherein one reading operation is to read the full state control data set S (A), and the other reading operation is to read the parameter value of the uncalibrated channel X once. Then the calibration function F(D) is obtained by fitting the initial data point value and one deviation of the parameter value, thereby obtaining the full state control data set S(X) of the uncalibrated channel X. Such calibration process needs not to perform a full state calibration on the phase shift amount and the attenuation amount of the uncalibrated channel X in different control states, not only greatly shortening the calibration time, reducing the required data storage capacity, but also significantly improving the calibration precision, thereby precisely and quickly completing the consistence calibration of the parameters among tens of thousands of channels, which has a wide promotion value.

2. After obtained for the first time, the deviations $D_{A1X1}$, $D_{A2X2} \ldots D_{AnXn}$ of uncalibrated channel can be stored in the memory of the system. Although the storage of the memory is slightly increased, the stored deviations $D_{A1X1}$, $D_{A2X2} \ldots D_{AnXn}$ can save two reading operations in the steps S02-S03 for subsequent acquisition of the full state control data set S(X) of the other channels, further shortening the system response time.

3. The phase shift deviation of the phase shifter used in the present invention is almost independent of the frequency variation, therefore the other channels can be calibrated at the same operating frequency, further improving the calibration speed and reducing the data storage capacity.

BRIEF DESCRIPTION OF THE DRAWINGS

The drawings described herein are intended to provide a further understanding of the embodiments of the present invention and form a part of the application, but does not constitute a limitation of the embodiments of the present invention, in which.

DETAILED DESCRIPTION OF THE PREFERRED EMBODIMENTS

In order to clarify the purposes, solutions and advantages for the present invention, with reference to the accompanying embodiments and drawings, the present invention is further described in detail, the embodiments and the illustrations thereof is merely illustrative of the invention and are not intended to limit the invention.

Example 1

Example 1 is to calibrate a phase shift amount of the phased array system. The particular calibration method comprises a reference channel calibration step and a calibration step of other channels to be calibrated, wherein:

the reference channel calibration step comprises following steps: selecting any one channel from all channels as a reference channel A, performing a full state calibration on the reference channel A to generate full state control data set S(A), the full state control data set S(A) including a plurality of state control data $S_{ijk}(A)$, and storing the plurality of the state control data $S_{ijk}(A)$, wherein i refers to an i-th specified parameter group, j refers to a j-th phase shift state, and k refers to a k-th attenuation state.

In Example 1, the calibration step of the channels (other than the reference channel) to be uncalibrated comprises a phase calibration with a constant attenuation state under at least one specified parameter group.

In particular, under a specified parameter group, a phase shift amount calibration with a constant attenuation state includes following steps.

S01: for a full state control data set S(A), a specified parameter group and an attenuation state corresponding to an operating attenuation state are selected, i.e. an i-th specified parameter group and a k-th operating attenuation state in the state control data $S_{ijk}(A)$ are selected. After the specified parameter group and its corresponding specified parameter values are selected, the constant parameter is the attenuation amount, and the parameter to be calibrated is the phase shift amount in different phase shift state.

S02: selecting one uncalibrated channel X from channels other than the reference channel A as the channel to be calibrated, selecting n groups of phase shift state control data from S(A) as phase shift state control data for the uncalibrated channel X, n≥1, wherein specified parameter values corresponding to the n groups of the phase shift state control data are equal to the specified parameter values selected in step S01, and an attenuation amount corresponding to the n groups of the phase shift state control data is equal to the attenuation amount selected in step S01;

during calibration operation of the uncalibrated channel X, the specified parameter values of the uncalibrated channel X are equal to the specified parameter values in the specified parameter group determined in step S01, and the attenuation amount of the uncalibrated channel X is equal to the attenuation amount selected in step S01; and respectively controlling phase shift amounts of the uncalibrated channel X with the selected n groups of the phase shift state control data, and reading a plurality of corresponding phase shift amounts $P_{X1}, P_{X2} \ldots P_{Xn}$ of the uncalibrated channel X.

S03: reading a plurality of phase shift amounts $P_{A1}$, $P_{A2} \ldots P_{An}$ of the reference channel A under control of the same n groups of the phase shift state control data, with specified parameter values of the reference channel equal to the specified parameter values in the specified parameter group determined in step S01, and the attenuation amount of the reference channel equal to the selected constant attenuation amount in step S01; and no precedence order between step S02 and the S03.

S04: calculating a phase shift deviation $D_{AqXq}$ between $P_{Aq}$ and $P_{Xq}$ according to a formula of $D_{AqXq}=P_{Xq}-P_{Aq}$, to obtain n phase shift deviations $D_{A1X1}$, $D_{A2X2} \ldots D_{AnXn}$.

S05: performing a fitting on at least two values selected from a group of initial data point, $D_{A1X1}$, $D_{A2X2} \ldots D_{AnXn}$ to obtain a phase calibration function F(D).

S06: calculating full state control data $S_{ijk}(X)$ of the uncalibrated channel X with a formula of $S_{ijk}(X)=S_{ijk}(A)+F_{ijk}$, wherein $S_{ijk}(A)$ refers to state control data of the reference channel A working at an i-th specified parameter group, a j-th phase shift amount state and a k-th attenuation amount state; $S_{ijk}(X)$ refers to the state control data of the uncalibrated channel X working at the i-th specified parameter group, the j-th phase shift amount state and the k-th attenuation amount state; $F_{ijk}$ is a phase calibration data generated by the phase calibration function F(D) as the uncalibrated channel X working at the i-th specified parameter group, the j-th phase shift amount state and the k-th attenuation amount state; thus the corresponding phase shift control data of the uncalibrated channel X is calibrated according to the required specified parameter group and the operating attenuation state of the uncalibrated channel X to obtain the full state phase shift control data from $S_{ijk}(X)$.

S07: repeating steps S02-S06 until all the channels obtaining full state phase shift control data, and then ending the calibration.

In some embodiments, the step S04 further comprises a step of storing $D_{A1X1}$, $D_{A2X2} \ldots D_{AnXn}$ after the $D_{A1X1}$, $D_{A2X2} \ldots D_{AnXn}$ is obtained, and the stored $D_{A1X1}$, $D_{A2X2} \ldots D_{AnXn}$ can be directly used for the fitting in the step S05 to obtain the calibration function F(D).

In some embodiments, according to the types of the phase shifters and the attenuators, the calibration step of the uncalibrated channel can calibrate under only one specified parameter group or calibrate under multiple specified parameter groups. For the calibration under multiple specified parameter groups, the frequency is variable, while the temperature and the input power can be variable or constant.

Example 2

For better understanding, Example 2 introduces specific values. The shift phase amounts of the uncalibrated channel B and the uncalibrated channel C are calibrated at an attenuation amount of 0 dB and under one specified parameter group, wherein the specified parameter group has a frequency of 4.5 GHz, a temperature of 25° C. and an input power of 0 dBm.

Particularly, the calibration method comprises a reference channel calibration step and a calibration step of other channels to be calibrated, wherein:

the reference channel calibration step comprises following steps: selecting any one channel from all channels as a reference channel A, performing a full state calibration on the reference channel A to generate full state control data set S(A), the full state control data set S(A) including a plurality of state control data $S_{ijk}(A)$, and storing the plurality of the state control data $S_{ijk}(A)$, wherein i refers to an i-th specified parameter group, j refers to a j-th phase shift state, and k refers to a k-th attenuation state.

The calibration step of the channels (other than the reference channel) to be calibrated comprises a phase shift amount calibration of an uncalibrated channel B and an uncalibrated channel C at the frequency of 4.5 GHz, the temperature of 25° C. and the input power of 0 dBm.

The phase shift amount calibration of the uncalibrated channel B and the uncalibrated channel C comprises following steps:

S01: the specified parameter group corresponding to the state control data in the full state control data $S_{ijk}(A)$ is selected, wherein the specified parameter group comprises the frequency of 4.5 GHz, the temperature of 25° C. and the input power of 0 dBm. The constant parameter is an attenuation amount of 0 dB. A group of state control data corresponding to the specified parameter group and the constant attenuation state is selected as the phase shift amount state control data of the uncalibrated channel B. The group of state control data is the state control data of the DAC of the analog phase shifter at the frequency of 4.5 GHz, which causes the control voltage Vt transmitting to the uncalibrated channel B to be 13 V.

S02: the uncalibrated channel B works at the frequency of 4.5 GHz, the temperature of 25° C., the input power of 0 dBm and the constant attenuation state of 0 dB. The aforementioned group of state control data is used to control the uncalibrated channel B to generate the phase shift amount PB corresponding to the control voltage of 13V under the control of the group of the state control data.

S03: reading the phase shift amount PA corresponding to the control voltage of 13V under the control of the group of the state control data when the reference channel A works at the specified parameter group and the constant attenuation state.

Figure 3:
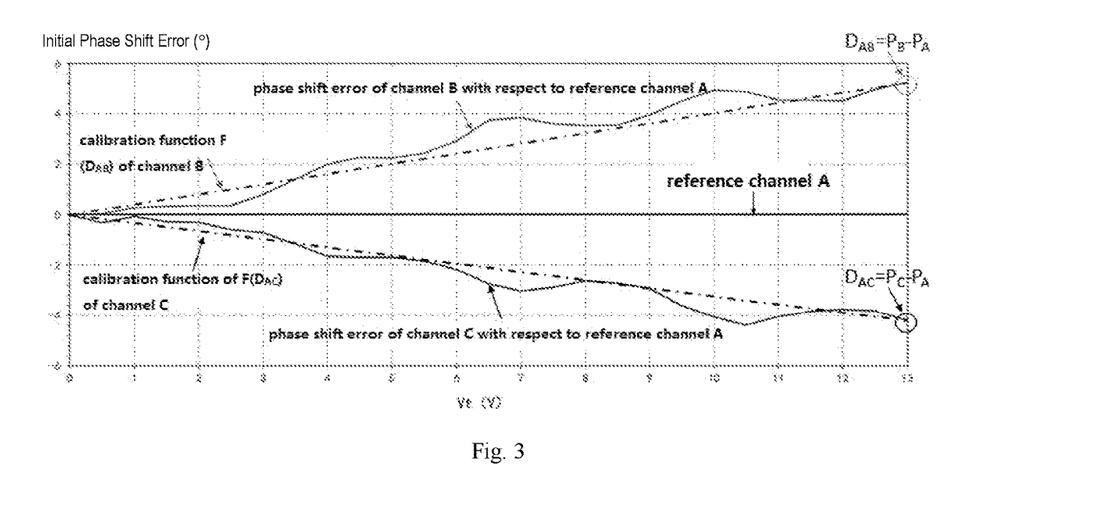
FIG. 3 is a diagram showing the phase shift error of the channels to be calibrated B, C with respect to the reference channel A according to one example of the present invention.

S04: calculating the phase shift deviation $D_{AB}$ according to PA and PB. As shown in FIG. 3, the phase shift deviation $D_{AB}$ is 5°.

S05: when the control voltage is 0 V and the phase shift deviation is 0°, as shown in FIG. 3, the phase calibration function $F(D_{AB})$ represented as a dashed line in FIG. 3 can be obtained by performing a fitting of initial data point value (0,0) and the data point (13, $D_{AB}$).

S06: the uncalibrated channel works at the specified parameter group and the constant attenuation state, and the phase calibration function $F(D_{AB})$ generates the phase calibration data $F_{ijk}$. The full state control data $S_{ijk}(B)$ of the uncalibrated channel B can be calculated with a formula of $S_{ijk}(B)=S_{ijk}(A)+F_{ijk}$.

S07: after the calibration of the uncalibrated channel B is completed, the steps S02-S06 are repeated to calibrate the uncalibrated channel C at the same operating frequency and the operating attenuation state.

Figure 4:
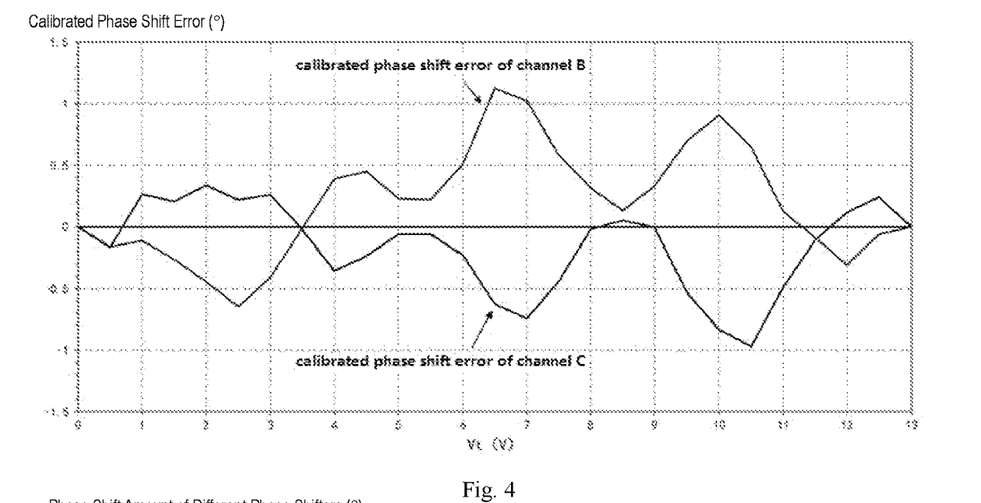
FIG. 4 is a diagram showing the calibrated phase shift error of the channels to be calibrated B, C according to one example of the present invention.

As shown in FIG. 4, the calibrated phase shift error of the uncalibrated channel B and the uncalibrated channel C are controlled less than 1°, thereby meeting the requirements of the high-precision phased array system.

The calibration process needs not to perform a full state calibration on the uncalibrated channel B and the uncalibrated channel C. The calibrations can be realized by only two reading operations and function fitting method, not only greatly shortening the calibration time, but also significantly reducing the required data storage capacity, thereby quickly completing the consistence calibration of the parameters among tens of thousands of channels, which generally has a calibration precision less than 1°.

Example 3

Figure 5:
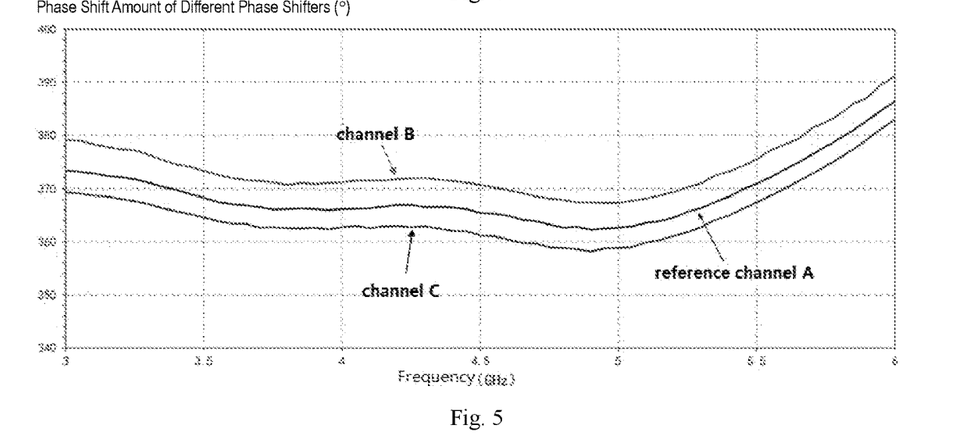
FIG. 5 is a diagram showing the trend that the shift phase amounts of the analog phase shifters in different channels vary with the frequency according to one example of the present invention.
Figure 6:
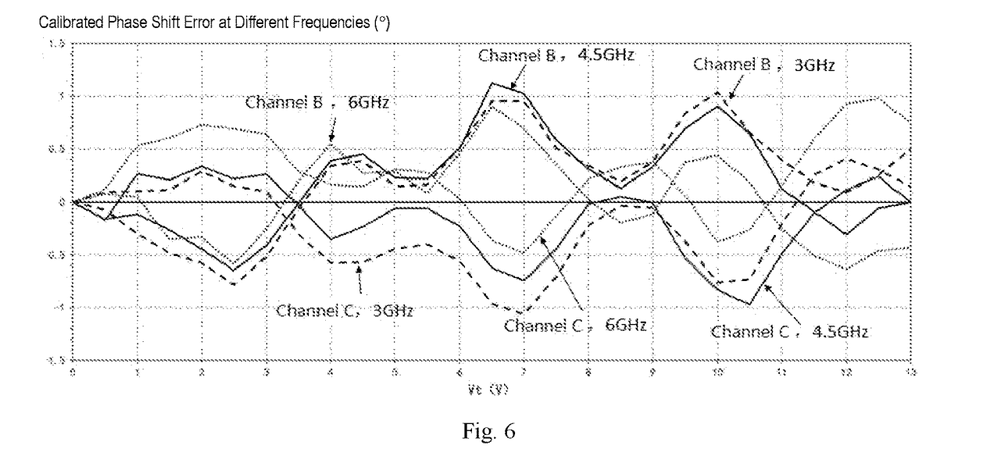
FIG. 6 is a diagram showing the calibrated phase shift error of the channels to be calibrated B, C at different frequencies according to one example of the present invention.

Based on Example 2, the phase shifters used in each channel of the multi-channel phased array system are the analog phase shifters disclosed in the patent No. CN108631754A. FIG. 5 shows the trend that the shift phase amounts of the phase shifters used in different channels vary with the frequency. As shown in FIG. 5, the phase shift amounts of the analog phase shifters used in different channels are almost independent of the frequency variation. Thus the calibration of the other channels can be performed at the same operating frequency to further improve the calibration speed and reduce the data storage capacity. As shown in FIG. 6, the calibration data obtained at the operating frequency of 4.5 GHz in Example 2 is multiplexed on the other frequencies such as 3 GHz and 6 GHz. The calibrated phase shift errors of the uncalibrated channel B and the uncalibrated channel C are still controlled in 1°.

Example 4

In Example 4, the difference from Example 2 is that the uncalibrated channel B and the uncalibrated channel C are calibrated at three different specified parameter groups. Wherein the temperature and the input power of these three specified parameter groups are 25° C. and 0 dBm, and the frequencies thereof are 3 GHz, 4.5 GHz and 6 GHz respectively.

During calibration process, the channels to be calibrated are first calibrated at the frequency of 3 GHz in accordance with the steps S01-S07 to obtain full state control data of all the channels to be calibrated at 3 GHz. Then the channels to be calibrated are calibrated at the frequency of 4.5 GHz in accordance with the steps S01-S07 until the full state control data of all the channels to be calibrated at the frequency of 4.5 GHz is obtained. Thereafter, the channels to be calibrated are calibrated at the frequency of 6 GHz in accordance with the steps S01-S07 to obtain full state control data of all the channels to be calibrated at 6 GHz.

Such calibration method is suitable for the digital phase shifters that the phase shift deviation may be affected by the operating frequency variation or the digital attenuation that the attenuation amount may be affected by operating frequency variation.

Example 5

In Example 5, the difference from Example 2 is that at a same specified parameter group, three groups of phase shift state control data of the uncalibrated channel under three control voltages Vt of 3 V, 5 V and 13 V are tested to obtain the phase shift deviation $D_{A1B1}$, $D_{A2B2}$ and $D_{A3B3}$. A fitting of initial data point, $(3,D_{A1B1})$, $(5,D_{A2B2})$ and $(13, D_{A3B3})$ is performed to obtain the calibration function F(D) which generates the phase shift calibration data to further improve the precision of the phase shift calibration of the channel to be calibrated.

Example 6

Example 6 is to calibrate an attenuation amount of the phased array system. The particular calibration method comprises a reference channel calibration step and a calibration step of other channels to be calibrated, wherein:

the reference channel calibration step comprises following steps: selecting any one channel from all channels as a reference channel A, performing a full state calibration on the reference channel A to generate full state control data set S(A), the full state control data set S(A) including a plurality of state control data $S_{ijk}(A)$, and storing the plurality of the state control data $S_{ijk}(A)$, wherein i refers to an i-th specified parameter group, j refers to a j-th phase shift state, and k refers to a k-th attenuation state.

In Example 6, the calibration step of the channels to be calibrated comprises a attenuation amount calibration with a constant phase shift state under at least one specified parameter group.

In particular, under each specified parameter group, an attenuation amount calibration with a constant phase shift state includes following steps.

S01: for a full state control data set S(A), a specified parameter group and a phase shift state corresponding to an operating phase shift state are selected, i.e. an i-th specified parameter group and a j-th operating phase shift state in the state control data $S_{ijk}$ (A) are selected. After the specified parameter group and its corresponding specified parameter values are selected, the constant parameter is the phase shift amount, and the parameter to be calibrated is the attenuation amount in different attenuation states.

S02: selecting one uncalibrated channel X from the channels other than the reference channel A as a channel to be calibrated, selecting n groups of attenuation amount state control data from S(A) for the uncalibrated channel X, n≥1, wherein specified parameter values corresponding to the n groups of the attenuation amount state control data are equal to the specified parameter values selected in step S01, and a phase shift amount corresponding to the n groups of the attenuation amount state control data is equal to the phase shift amount selected in step S01;

during calibration operation of the uncalibrated channel X, the specified parameter values of the uncalibrated channel X are equal to the specified parameter values in the specified parameter group determined in step S01, and the phase shift amount of the uncalibrated channel X is equal to the phase shift amount selected in step S01; and respectively controlling attenuation amounts of the uncalibrated channel X with the selected n groups of the attenuation amount state control data, and reading a plurality of corresponding attenuation amounts $P_{X1}$, $P_{X2}$ ... $P_{Xn}$ of the uncalibrated channel X.

S03: reading a plurality of attenuation amounts $P_{A1}$, $P_{A2}$ ... $P_{An}$ of the reference channel A under control of the same n groups of the attenuation amount state control data, with specified parameter values of the reference channel equal to the specified parameter values in the specified parameter group determined in step S01, and the phase shift amount of the reference channel equal to the selected phase shift amount; and no precedence order between step S02 and step S03.

S04: calculating an attenuation deviation $D_{AqXq}$ between $P_{Aq}$ and $P_{Xq}$ according to a formula of $D_{AqXq}=P_{Xq}-P_{Aq}$, to obtain n attenuation deviations $D_{A1X1}$, $D_{A2X2}$ ... $D_{AnXn}$.

S05: performing a fitting on at least two values selected from a group of initial data point, $D_{A1X1}$, $D_{A2X2}$ ... $D_{AnXn}$ to obtain an attenuation amount calibration function F(D).

S06: calculating full state control data $S_{ijk}(X)$ of the uncalibrated channel X with a formula of $S_{ijk}(X)=S_{ijk}(A)+F_{ijk}$, wherein $S_{ijk}$ (A) refers to state control data of the reference channel A working at an i-th specified parameter group, a j-th phase shift amount state and a k-th attenuation amount state; $S_{ijk}(X)$ refers to the state control data of the uncalibrated channel X working at the i-th specified parameter group, the j-th phase shift amount state and the k-th attenuation amount state; $F_{ijk}$ is the attenuation amount calibration data generated by the attenuation amount calibration function F(D) as the uncalibrated channel X working at the i-th specified parameter group, the j-th phase shift amount state and the k-th attenuation amount state; thus the corresponding attenuation amount control data of the uncalibrated channel X is calibrated according to the required specified parameter group and the operating phase shift state of the uncalibrated channel X to obtain the full state attenuation amount control data $S_{ijk}(X)$.

S07: repeating steps S02-S06 until all the channels obtaining full state attenuation amount control data, and then ending the calibration.

The specific embodiments described above further explain the purposes, technical solutions and beneficial effects of the present invention. It is to be understood that the foregoing is only illustrative of the embodiment of the present invention, and is not intended to limit the scope of the present invention. Any modifications, equivalents, and improvements made within the spirit and scope of the present invention should be included in the scope of protection of the present invention.

What is claimed is:

1. A method for a channel parameters consistency calibration in a multi-channel phased array system comprising multiple channels, the method comprising a reference channel calibration step for a reference channel and a calibration step of other channels to be calibrated, wherein:

the reference channel calibration step comprises following steps: selecting a channel from the multiple channels as the reference channel, performing a calibration on the reference channel to generate a control data set S(A) comprising a plurality of state control data, and storing the control data set S(A);

a selection step of a parameter to be calibrated is performed prior to the calibration step of the other channels to be calibrated, wherein the parameter to be calibrated is a phase shifting amount or an attenuation amount; while one of the phase shifting amount and the attenuation amount is selected as the parameter to be calibrated, the other one is selected as a constant parameter; and the calibration step of the other channels to be calibrated comprises a calibration under at least one specified parameter group, the calibration under the at least one specified parameter group comprising following steps:

S01: for the control data set S(A), selecting a specified parameter group and a value of the constant parameter, and determining specified parameter values in the specified parameter group;

S02: selecting one uncalibrated channel X from channels other than the reference channel as the channel to be calibrated, selecting n groups of state control data from S(A) for the uncalibrated channel X, n≥1, wherein specified parameter values corresponding to the n groups of the state control data are equal to the specified parameter values selected in step S01, and a value of the constant parameter corresponding to the n groups of the state control data is equal to the constant parameter value selected in step S01;

during calibration operation of the uncalibrated channel X, the specified parameter values of the uncalibrated channel X being equal to the specified parameter values in the specified parameter group determined in step S01, and a constant parameter value of the uncalibrated channel X being equal to the constant parameter value selected in step S01; and respectively controlling parameter values of the uncalibrated channel X with the selected n groups of the state control data, and reading a plurality of corresponding parameter values $P_{X1}$, $P_{X2}$ ... $P_{Xn}$ of the uncalibrated channel X;

S03: reading a plurality of parameter values $P_{A1}$, $P_{A2}$ ... $P_{An}$ of the reference channel A under control of the same n groups of the state control data, with specified parameter values of the reference channel A equal to the specified parameter values in the specified parameter group determined in step S01, and a value of the constant parameter of the reference channel A equal to the selected value of the constant parameter selected in step S01; and no precedence order between step S02 and step S03;

S04: calculating a deviation $D_{AqXq}$ between $P_{Aq}$ and $P_{Xq}$ according to a formula of $D_{AqXq}=P_{Xq}-P_{Aq}$, to obtain n deviations $D_{A1X1}$, $D_{A2X2}$ ... $D_{AnXn}$;

S05: performing a fitting on at least two values selected from a group of initial data point, $D_{A1X1}$, $D_{A2X2}$ ... $D_{AnXn}$ to obtain a calibration function F(D);

S06: calculating a control data set S(X) of the parameter to be calibrated of the uncalibrated channel X with a formula of S(X)=S(A)+F, wherein F refers to calibration data generated by the calibration function F(D) for the uncalibrated channel X based on the specified parameter values and the value of the constant parameter; and S07: repeating steps S02-S06 until control data of the parameter to be calibrated are obtained for each of the multiple channels.

2. The method of claim 1, wherein the step S04 further comprises a step of storing $D_{A1X1}$, $D_{A2X2}$ ... $D_{AnXn}$ after the $D_{A1X1}$, $D_{A2X2}$ ... $D_{AnXn}$ is obtained, and the stored $D_{A1X1}$, $D_{A2X2}$ ... $D_{AnXn}$ are directly used for the fitting in the step S05 to obtain the calibration function F(D).

3. The method of claim 1, wherein the one or more specified parameters in each of the at least one specified parameter groups comprise one or more of temperature, frequency and input power.

4. The method of claim 1, wherein the control data set S(A) comprises state control data of a phase shifter and state control data of an variable attenuator in the reference channel.

5. The method of claim 4, wherein the phase shifter comprises an analog phase shifter.

6. The method of claim 5, wherein the state control data of the phase shifter is used to control a digital-to-analog converter to generate a control voltage of the analog phase shifter.

7. The method of claim 4, wherein in the step S04, n=1, and the calibration function is obtained by performing a fitting on an initial data point and $D_{A1X1}$.

8. The method of any of claim 1, the calibration step of the channel to be calibrated comprising the calibration under a plurality of specified parameter groups, wherein in a calibration process, after the calibration under each of the plurality of the specified parameter groups are completed, the steps S01-S07 are repeated, wherein an uncalibrated one of the plurality of the specified parameter groups is selected in the step S01 as a specified parameter group for a new calibration, until all of the plurality of the predetermined specified parameter groups are calibrated to obtain control data of the multiple channels under all of the plurality of the specified parameter groups.

9. The method of claim 8, wherein the one or more specified parameters in each of the plurality of the specified parameter groups comprise a frequency, and the calibration step of the channel to be calibrated comprises the calibration at one or more operating frequencies.

10. The method of claim 8, wherein the control data set S(A) comprises state control data of a digital-to-analog converter of a phase shifter and state control data of a variable attenuator in the reference channel.

11. A multi-channel phased array system comprising:
multiple channels with each channel comprising a phase shifter and a variable attenuator, the multiple channels have channel parameters calibrated using steps comprising:
selecting a channel from the multiple channels as a reference channel;
performing a calibration on the reference channel to generate a control data set S(A) comprising a plurality of state control data of the reference channel, and storing the control data set S(A);
for channels other than the reference channels, selecting one of the phase shifting amount and the attenuation amount as a parameter to be calibrated, the other one is selected as a constant parameter;
calibrating channels other than the reference channels with steps comprising:
S01: for the control data set S(A), selecting a specified parameter group and a value of the constant parameter, and determining specified parameter values in the specified parameter group;
S02: selecting one uncalibrated channel X from channels other than the reference channel as the channel to be calibrated, selecting n groups of state control data from S(A) for the uncalibrated channel X, n≥1, wherein specified parameter values corresponding to the n groups of the state control data are equal to the specified parameter values selected in step S01, and a value of the constant parameter corresponding to the n groups of the state control data is equal to the constant parameter value selected in step S01; during calibration operation of the uncalibrated channel X, the specified parameter values of the uncalibrated channel X being equal to the specified parameter values in the specified parameter group determined in step S01, and a constant parameter value of the uncalibrated channel X being equal to the constant parameter value selected in step S01; and respectively controlling parameter values of the uncalibrated channel X with the selected n groups of the state control data, and reading a plurality of corresponding parameter values $P_{X1}, P_{X2} \ldots P_{Xn}$ of the uncalibrated channel X;
S03: reading a plurality of parameter values $P_{A1}, P_{A2} \ldots P_{An}$ of the reference channel A under control of the same n groups of the state control data, with specified parameter values of the reference channel A equal to the specified parameter values in the specified parameter group determined in step S01, and a value of the constant parameter of the reference channel A equal to the selected value of the constant parameter selected in step S01; and no precedence order between step S02 and step S03;
S04: calculating a deviation $D_{AqXq}$ between $P_{Aq}$ and $P_{Xq}$ according to a formula of $D_{AqXq}=P_{Xq}-P_{Aq}$, to obtain n deviations $D_{A1X1}, D_{A2X2} \ldots D_{AnXn}$;
S05: performing a fitting on at least two values selected from a group of initial data point, $D_{A1X1}, D_{A2X2} \ldots D_{AnXn}$ to obtain a calibration function F(D);
S06: calculating a control data set S(X) of the parameter to be calibrated of the uncalibrated channel X with a formula of S(X)=S(A)+F, wherein F refers to calibration data generated by the calibration function F(D) for the uncalibrated channel X based on the specified parameter values and the value of the constant parameter; and
S07: repeating steps S02-S06 until all the channels obtaining control data of the parameter to be calibrated, and then ending the calibration.

12. The multi-channel phased array system of claim 11, wherein the step S04 further comprises a step of storing $D_{A1X1}, D_{A2X2} \ldots D_{AnXn}$ after the $D_{A1X1}, D_{A2X2} \ldots D_{AnXn}$ is obtained, and the stored $D_{A1X1}, D_{A2X2} \ldots D_{AnXn}$ are directly used for the fitting in the step S05 to obtain the calibration function F(D).

13. The multi-channel phased array system of claim 11, wherein the one or more specified parameters in each of the at least one specified parameter groups comprise one or more of temperature, frequency and input power.

14. The multi-channel phased array system of claim 11, wherein the control data set S(A) comprises state control data of the phase shifter and state control data of the variable attenuator in the reference channel.

15. The multi-channel phased array system of claim 14, wherein the phase shifter comprises an analog phase shifter comprising a digital-to-analog converter.

16. The multi-channel phased array system of claim 15, wherein the state control data of the phase shifter is used to control the digital-to-analog converter to generate a control voltage of the analog phase shifter.

17. The multi-channel phased array system of claim 14, wherein in the step S04, n=1, and the calibration function is obtained by performing a fitting on an initial data point and $D_{A1X1}$.

18. The multi-channel phased array system of claim 11, the calibration step of the channel to be calibrated comprising the calibration under a plurality of specified parameter groups, wherein after the calibration under each of the plurality of the specified parameter groups are completed, the steps S01-S07 are repeated, wherein an uncalibrated one of the plurality of the specified parameter groups is selected in the step S01 as a specified parameter group for a new calibration, until all of the plurality of the predetermined specified parameter groups are calibrated to obtain control data for each of the multiple channels under all of the plurality of the specified parameter groups.

19. The multi-channel phased array system of claim 18, wherein the one or more specified parameters in each of the plurality of the specified parameter groups comprise a frequency, and the calibration step of the channel to be calibrated comprises calibration at one or more operating frequencies.

20. The multi-channel phased array system of claim 18, wherein the control data set S(A) comprises state control data of a digital-to-analog converter within the phase shifter and state control data of the variable attenuator in the reference channel.

* * * * *